US009589684B2

(12) United States Patent
Bass et al.

(10) Patent No.: US 9,589,684 B2
(45) Date of Patent: Mar. 7, 2017

(54) APPARATUSES AND METHODS FOR CONTROLLING MOVEMENT OF COMPONENTS (75) Inventors: John R. Bass, Wilmington, NC (US); Robin D. Sprague, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 949 days.

(21) Appl. No.: 13/472,635

(22) Filed: May 16, 2012

(65) Prior Publication Data
US 2013/0308739 A1 Nov. 21, 2013

(51) Int. Cl.
G21C 13/032 (2006.01)
G21C 15/25 (2006.01)
G21C 17/10 (2006.01)

(52) U.S. Cl.
CPC ........... *G21C 13/032* (2013.01); *G21C 15/25* (2013.01); *G21C 17/10* (2013.01); *Y02E 30/40* (2013.01); *Y10T 403/581* (2015.01)

(58) Field of Classification Search
CPC ................................. G21C 15/25; B25B 5/00
USPC .... 376/302, 372, 392; 285/420; 417/63, 360
See application file for complete search history.

(56) References Cited

U.S. PATENT DOCUMENTS

| 3,698,489 | A | 10/1972 | Norrell et al. |
| 4,285,770 | A | 8/1981 | Chi et al. |
| 6,394,765 | B1 | 5/2002 | Erbes et al. |
| 6,438,192 | B1 | 8/2002 | Erbes et al. |
| 6,450,774 | B1 | 9/2002 | Erbes et al. |
| 6,587,535 | B1 | 7/2003 | Erbes et al. |
| 8,964,929 | B2 | 2/2015 | Sprague et al. |
| 2007/0189434 | A1 | 8/2007 | Jensen |
| 2008/0031741 | A1 | 2/2008 | Torres |
| 2008/0107227 | A1* | 5/2008 | Koepke ................ G21C 17/017 376/302 |
| 2010/0032064 | A1 | 2/2010 | Dreizin |
| 2010/0242279 | A1 | 9/2010 | Sprague et al. |
| 2010/0329412 | A1 | 12/2010 | Ellison et al. |

(Continued)

FOREIGN PATENT DOCUMENTS

| DE | 9107970 U1 | 12/1991 |
| JP | 6084412 A | 5/1985 |

(Continued)

OTHER PUBLICATIONS

EP Search Report issued in connection with corresponding EP Patent Application No. 13167171 dated on Aug. 28, 2013.

(Continued)

*Primary Examiner* — Jack W Keith
*Assistant Examiner* — Lily C Garner
(74) *Attorney, Agent, or Firm* — Harness, Dickey & Pierce (57) ABSTRACT An apparatus for controlling movement of a first component integrated with a second component may include a first clamp configured to engage the first component, a second clamp configured to engage the second component, and a plurality of connectors configured to connect the first and second clamps. The connectors may allow movement of the first clamp relative to the second clamp in a first direction between the first and second clamps. The connectors may limit movement of the first clamp relative to the second clamp in a second direction perpendicular to the first direction.

21 Claims, 8 Drawing Sheets

(56) References Cited

U.S. PATENT DOCUMENTS

| | | |
|---|---|---|
| 2011/0052424 A1 | 3/2011 | Bass et al. |
| 2011/0135049 A1 | 6/2011 | Wroblewski et al. |
| 2011/0176938 A1 | 7/2011 | DeFilippis et al. |

FOREIGN PATENT DOCUMENTS

| | | |
|---|---|---|
| JP | 08135620 A | 5/1996 |
| JP | 2001349484 A | 12/2001 |
| JP | 2010007856 A | 1/2010 |
| WO | WO-2011/035043 A1 | 3/2011 |

OTHER PUBLICATIONS

Unofficial English translation of Office Action issued in connection with corresponding JP Application No. 2013-100819 on Sep. 1, 2015.

Unofficial English Translation of Japanese Office Action issued in connection with corresponding JP Application No. 2013100819 on Mar. 3, 2015.

Unofficial English translation of Office Action issued in connection with corresponding EP Application No. 13167171.1-1556 on Jul. 6, 2015.

* cited by examiner

(Related Art)

FIG. 1

(Related Art)

FIG. 2

(Related Art)

APPARATUSES AND METHODS FOR CONTROLLING MOVEMENT OF COMPONENTS

BACKGROUND

1. Field

Example embodiments generally relate to apparatuses and methods for controlling movement of components. The controlling may involve, for example, allowing, limiting, and/or preventing movement. The components may be integrated components. Example embodiments also relate to nuclear reactor plants and to apparatuses and methods for controlling movement of components in the nuclear power plants.

2. Description of Related Art

A reactor pressure vessel ("RPV") of a boiling water reactor ("BWR") may have a generally cylindrical shape and may be closed at both ends (e.g., by a bottom head and a removable top head). A top guide may be spaced above a core plate within the RPV. A core shroud, or shroud, may surround the core and may be supported by a shroud support structure. The shroud may have a generally cylindrical shape and may surround both the core plate and the top guide. There may be a space or annulus located between the cylindrical RPV and the cylindrically shaped shroud.

In a BWR, hollow tubular jet pumps positioned within the annulus provide the required reactor core water flow. The upper portion of a jet pump, known as the inlet mixer, may be laterally positioned and supported by related art jet pump restrainer brackets. The restrainer brackets may support the inlet mixer by attaching to the adjacent jet pump riser pipe. The lower portion of a jet pump, known as the diffuser, may be coupled to the inlet mixer by a slip joint. The slip joint between the inlet mixer and a collar of the diffuser may have an operating clearance that accommodates relative axial thermal-expansion movement between the upper and lower portions of the jet pump. The operating clearance also may permit leakage flow from the driving pressure inside the jet pump.

Excessive leakage flow may cause oscillating motion in the slip joint, known as flow induced vibration ("FIV") or slip joint leakage flow induced vibration ("SJLFIV"), which may be a source of detrimental vibration excitation in the jet pump assembly. While related art jet pump restrainer brackets may provide system stiffness that mitigates vibration of system components, SJLFIV may still occur between the inlet mixer and diffuser. The slip joint leakage rate may increase due, for example, to single loop operation, increased core flow, and/or jet pump crud deposition.

Thermal and pressure displacements of the shroud and RPV may diminish alignment interaction loads in the jet pump assembly that are beneficial in restraining vibration, such as a lateral force in the slip joint. The resultant increased vibration levels and corresponding vibration loads on the piping and supports may cause jet pump component degradation from wear and fatigue.

High levels of FIV may be possible in certain jet pump designs at some abnormal operational conditions having increased leakage rates. Therefore, it may be desirable to provide a jet pump assembly that has a lateral load in the slip joint area to maintain the stiffness of the interface between the inlet mixer and diffuser to prevent oscillating motion and suppress FIV.

Related art apparatuses and methods are discussed, for example, in U.S. Pat. No. 4,285,770 to Chi et al. ("the '770 patent"); U.S. Pat. No. 6,394,765 B1 to Erbes et at ("the '765 patent"); U.S. Pat. No. 6,438,192 B1 to Erbes et at ("the '192 patent"); U.S. Pat. No. 6,450,774 B1 to Erbes et at ("the '774 patent"); and U.S. Pat. No. 6,587,535 B1 to Erbes et al. ("the '535 patent"). The disclosures of the '192 patent, the '535 patent, the '765 patent, the '770 patent, and the '774 patent are incorporated in this application by reference in their entirety.

Related art apparatuses and methods also are discussed, for example, in U.S. Patent Application Publication Nos. 2008/0031741 A1 to Torres ("the '741 publication"); 2010/0242279 A1 to Sprague et at ("the '279 publication"); 2010/0329412 A1 to Ellison et al. ("the '412 publication"); 2011/0052424 A1 to Bass et al. ("the '424 publication"); 2011/0135049 A1 to Wroblewski et at ("the '049 publication"); and 2011/0176938 A1 to DeFilippis et al. ("the '938 publication"). The disclosures of the '049 publication, the '279 publication, the '412 publication, the '424 publication, the '741 publication, and the '938 publication are also incorporated in this application by reference in their entirety.

Additionally, related art apparatuses and methods also are discussed, for example, in U.S. patent application Ser. No. 12/982,280 to Sprague et al. entitled "Method and Apparatus for a Jet Pump Three Point Slip Joint Clamp" ("the '280 application"). The disclosure of the '280 application is likewise incorporated in this application by reference in its entirety.

Moreover, related art apparatuses and methods are discussed, for example, in World Intellectual Property Organization ("WIPO") International Publication No. WO 2011/035043 A1.

SUMMARY

Example embodiments may provide apparatuses and methods for controlling movement of a first component integrated with a second component. Example embodiments also may provide apparatuses and methods for controlling movement of components in a nuclear power plant.

In example embodiments, an apparatus for controlling movement of a first component integrated with a second component may include a first clamp configured to engage the first component, a second clamp configured to engage the second component, and/or a plurality of connectors configured to connect the first and second clamps. The connectors may allow movement of the first clamp relative to the second clamp in a first direction between the first and second clamps. The connectors may limit movement of the first clamp relative to the second clamp in a second direction perpendicular to the first direction.

In example embodiments, the connectors may allow linear movement of the first clamp relative to the second clamp in the first direction.

In example embodiments, the connectors may limit linear movement of the first clamp relative to the second clamp in the second direction.

In example embodiments, the connectors may limit rotational movement of the first clamp relative to the second clamp about an axis defined in the first direction.

In example embodiments, the connectors may prevent linear movement of the first clamp relative to the second clamp in the second direction.

In example embodiments, the connectors may prevent rotational movement of the first clamp relative to the second clamp about an axis defined in the first direction.

In example embodiments, the first clamp may include two or more first clamp sections.

In example embodiments, the two or more first clamp sections may be connected together using a plurality of first clamp bolts.

In example embodiments, the first clamp may include two or more first clamp sections and/or the second clamp may include two or more second clamp sections.

In example embodiments, the two or more first clamp sections may be connected together using a plurality of first clamp bolts and/or the two or more second clamp sections may be connected together using a plurality of second clamp bolts.

In example embodiments, an apparatus for controlling movement of components in a nuclear power plant, the nuclear power plant including a reactor pressure vessel and a jet pump assembly within the reactor pressure vessel, may include a first clamp configured to engage the jet pump assembly, a second clamp configured to engage the jet pump assembly, and/or a plurality of connectors configured to connect the first and second clamps. The connectors may allow movement of the first clamp relative to the second clamp in an axial direction of the jet pump assembly. The connectors may limit movement of the first clamp relative to the second clamp in a direction perpendicular to the axial direction of the jet pump assembly.

In example embodiments, the first clamp may be configured to engage an inlet mixer of the jet pump assembly.

In example embodiments, the second clamp may be configured to engage a diffuser of the jet pump assembly.

In example embodiments, the connectors may allow linear movement of the first clamp relative to the second clamp in the axial direction of the jet pump assembly.

In example embodiments, the connectors may limit linear movement of the first clamp relative to the second clamp in the direction perpendicular to the axial direction of the jet pump assembly.

In example embodiments, the connectors may limit rotational movement of the first clamp relative to the second clamp about the axial direction of the jet pump assembly.

In example embodiments, an apparatus for controlling movement of components in a nuclear power plant, the nuclear power plant including a reactor pressure vessel and a jet pump assembly within the reactor pressure vessel, may include a first clamp configured to engage an inlet mixer of the jet pump assembly, a second clamp configured to engage a diffuser of the jet pump assembly, and/or a plurality of connectors configured to connect the first and second clamps. The first clamp, second clamp, and connectors may allow movement of the inlet mixer relative to the diffuser in an axial direction of the jet pump assembly. The first clamp, second clamp, and connectors may limit movement of the inlet mixer relative to the diffuser in a direction perpendicular to the axial direction of the jet pump assembly.

In example embodiments, the first clamp, second clamp, and connectors may allow linear movement of the inlet mixer relative to the diffuser in the axial direction of the jet pump assembly.

In example embodiments, the first clamp, second clamp, and connectors may limit linear movement of the inlet mixer relative to the diffuser in the direction perpendicular to the axial direction of the jet pump assembly.

In example embodiments, the first clamp, second clamp, and connectors may limit rotational movement of the inlet mixer relative to the diffuser about the axial direction of the jet pump assembly.

In example embodiments, a method for controlling movement of a first component integrated with a second component may include engaging the first component with a first clamp, engaging the second component with a second clamp, and connecting the first and second clamps using a plurality of connectors. The connectors may allow movement of the first clamp relative to the second clamp in a first direction between the first and second clamps. The connectors may limit movement of the first clamp relative to the second clamp in a second direction perpendicular to the first direction.

These and other features and advantages of this invention are described in, or are apparent from, the following detailed description of various example embodiments of the apparatuses and methods according to the invention.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION OF EXAMPLE EMBODIMENTS

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural fog ills as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It should also be noted that in some alternative implementations, functions and/or acts noted may occur out of the order noted in the figures. For example, two figures shown in succession may in fact be executed substantially concurrently or may sometimes be executed in the reverse order, depending upon the functionality and/or acts involved.

Reference will now be made to example embodiments, which are illustrated in the accompanying drawings, wherein like reference numerals may refer to like components throughout.

Figure 1:
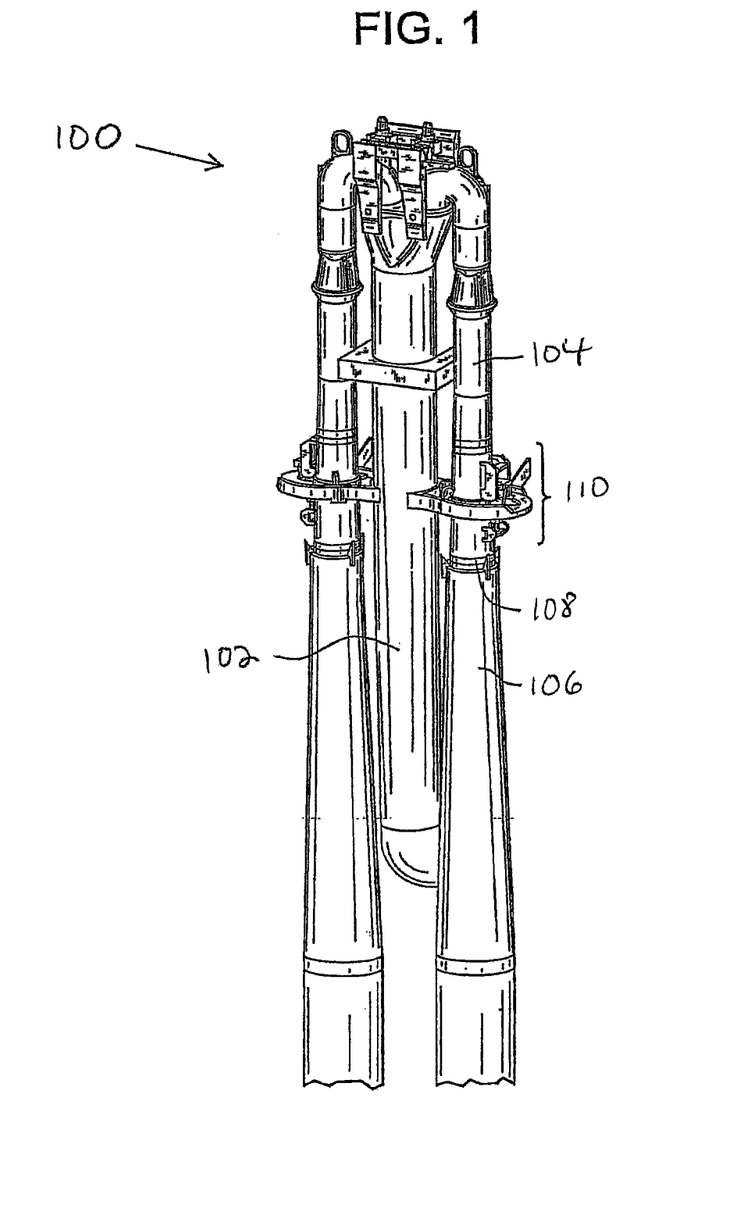
FIG. 1 is a perspective view of a related art BWR jet pump assembly.

FIG. 1 is a perspective view of related art BWR jet pump assembly 100. Major components of jet pump assembly 100 include riser pipe 102, inlet mixers 104, and diffusers 106. Inlet mixers 104 insert into respective diffusers 106. The interface between inlet mixer 104 and associated diffuser 106 is slip joint 108. Jet pump restrainer brackets 110 may be used to stabilize movement of inlet mixers 104. This stabilization may reduce SJLFIV of and leakage at slip joint 108. As may be seen, the body of inlet mixer 104 generally has a smaller diameter than the body of associated diffuser 106.

Figure 2:
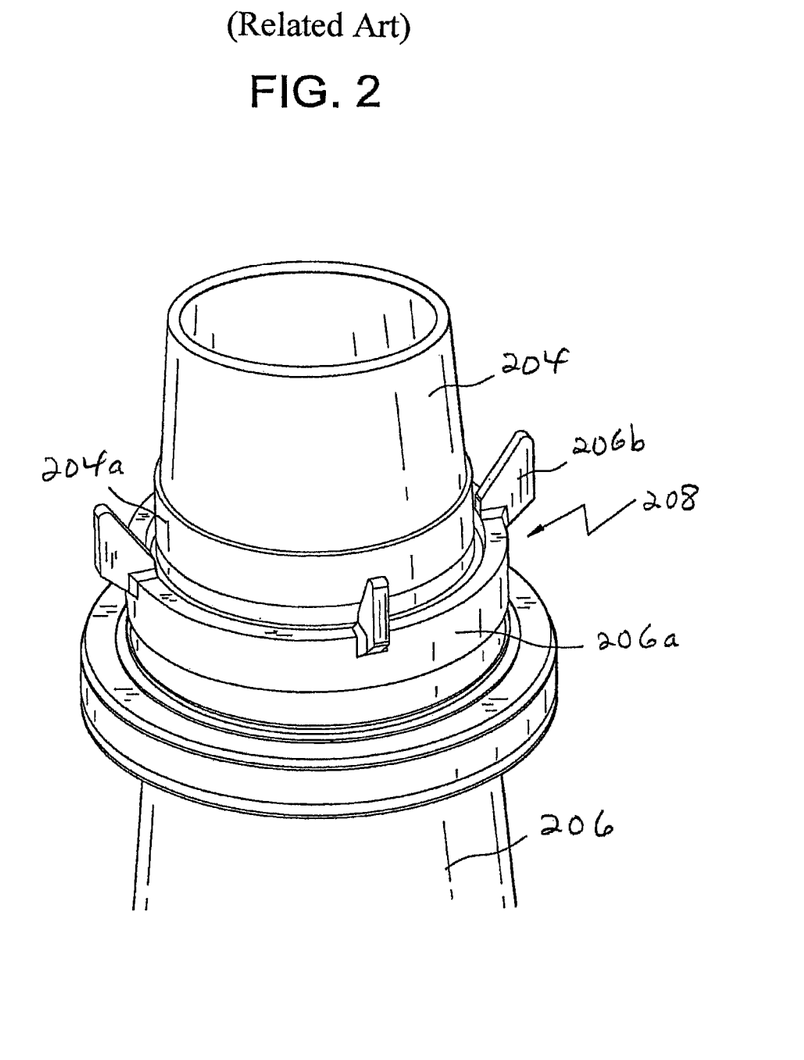
FIG. 2 is a detailed view of a related art slip joint between an inlet mixer and diffuser of a BWR jet pump assembly.

FIG. 2 is a detailed view of related art slip joint 208. The interface between inlet mixer 204 and associated diffuser 206 is slip joint 208. It should be noted that bottom portion 204a of inlet mixer 204 inserts into upper crown 206a of diffuser 206. Guide ears 206b of diffuser 206 typically assist with proper insertion by guiding bottom portion 204a into upper crown 206a as inlet mixer 204 is lowered onto diffuser 206.

Figure 3:
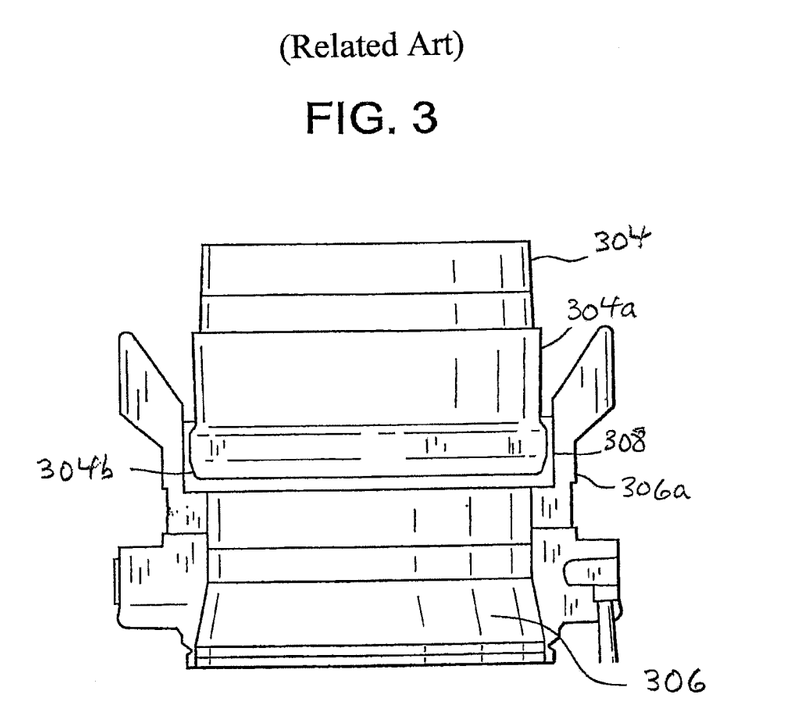
FIG. 3 is a cross-sectional view of the related art slip joint between the inlet mixer and diffuser of the BWR jet pump assembly.

FIG. 3 is a cross-sectional view of related art slip joint 308. The interface between inlet mixer 304 and associated diffuser 306 is slip joint 308. As before, bottom portion 304a of inlet mixer 304 inserts into upper crown 306a of diffuser 306. Distal end 304b of inlet mixer 304 rests in upper crown 306a of diffuser 306 to form slip joint 308. SJLFIV may occur in slip joint 308 when tolerances between distal end 304b of inlet mixer 304 and upper crown 306a of diffuser 306 are inconsistent and/or excessive. Additionally, leakage may occur at the interface, as water may leak between distal end 304b of inlet mixer 304 and upper crown 306a of diffuser 306 and out of slip joint 308.

Figure 4:
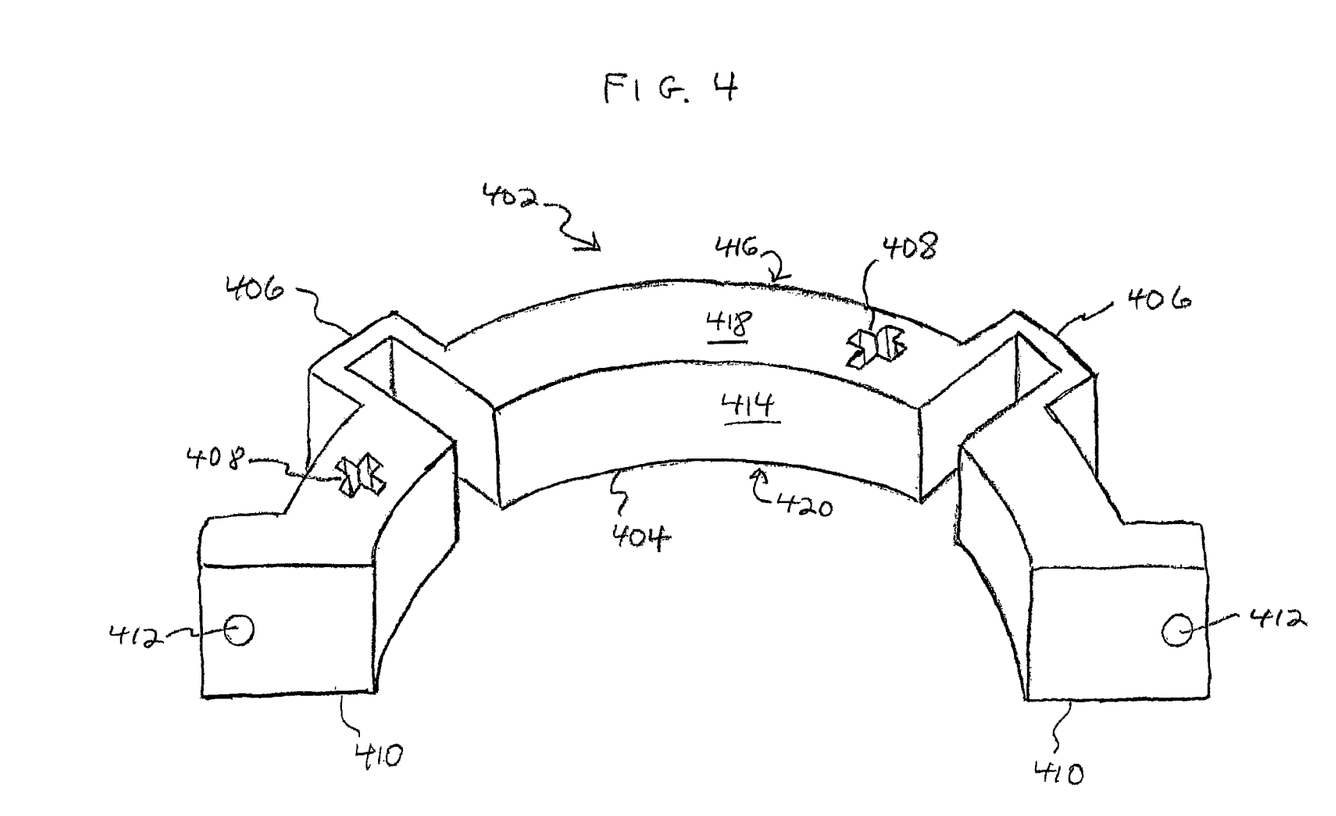
FIG. 4 is a detailed view of a first clamp section of a first clamp in accordance with example embodiments.

FIG. 4 is a detailed view of first clamp section 402 of first clamp 400 (shown in FIG. 7) in accordance with example embodiments. First clamp section 402 may include body 404, offsets 406, channels 408, end portions 410, and/or through holes 412. Body 404 may include inner edge 414, outer edge 416, top surface 418, and/or bottom surface 420.

First clamp 400 may be designed for installation on an associated diffuser. As a result, first clamp section 402 may be physically larger and/or have a larger radius of curvature than a clamp section designed for installation on an associated inlet mixer.

First clamp 400 may include two first clamp sections 402 joined together to substantially encircle the associated diffuser. In the alternative, first clamp 400 may include a single-piece clamp. However, the use of a single-piece clamp may require installation prior to or together with installation of the associated inlet mixer and/or diffuser, or at least partial disassembly of an already installed inlet mixer and/or diffuser. In the alternative, first clamp 400 may include more than two clamp sections. Modification of first clamp 400 to include a single-piece clamp or more than two clamp sections would be understood by a person having ordinary skill in the art ("PHOSITA").

Although not required, first clamp sections 402 of first clamp 400 may be substantially identical. Such an arrangement would facilitate manufacture, supply, installation, and replacement of first clamp 400.

A cross-section of body 404 may be square, rectangular, or some other shape. Modification of body 404 to a desired cross-sectional shape would be understood by a PHOSITA.

A diffuser may include two or more guide ears (e.g., four guide ears). The guide ears may be evenly spaced around the periphery of the diffuser. The guide ears may assist in the integration of an inlet mixer with an associated diffuser. For example, this assistance may be particularly beneficial when attempting to remotely insert an inlet mixer into a diffuser, where the interface between the inlet mixer and the diffuser forms a slip joint.

As shown in FIG. 4, first clamp section 402 may include offsets 406. Offsets 406 in first clamp section 402 may provide clearance for guide ears of the associated diffuser. If the guide ears are evenly spaced around the periphery of the diffuser, then offsets 406 may be evenly spaced around first clamp 400. Modification of first clamp sections 402 so that offsets 406 may be evenly spaced around first clamp 400 would be understood by a PHOSITA.

Positioning of the guide ears of the associated diffuser in offsets 406 may help to prevent movement of first clamp section 402 in the vertical direction (toward the associated inlet mixer) and/or may help to prevent rotation of first clamp section 402 about an axial direction of the associated diffuser.

As shown in FIG. 4, first clamp section 402 may include channels 408. Channels 408 may extend completely through body 404 (e.g., from top surface 418 to bottom surface 420).

In the alternative, channels 408 may extend only partly through body 404. Modification of body 404 so that channels 408 extend completely through or only partly through body 404 would be understood by a PHOSITA.

As shown in FIG. 4, first clamp section 402 may include two channels 408. In the alternative, first clamp section 402 may include only one channel 408 or more than two channels 408. Modification of first clamp section 402 to include only one channel 408 or more than two channels 408 would be understood by a PHOSITA.

As shown in FIG. 4, channels 408 may be disposed within body 404 of first clamp section 402 (i.e., between inner edge 414 and outer edge 416). In the alternative, for example, channels 408 may be disposed on inner edge 414 of body 404 (e.g., so that inner edge 414 includes a portion of channel 408) and/or outer edge 416 of body 404 (e.g., so that outer edge 416 includes a portion of channel 408). Modification of first clamp section 402 so that channels 408 are disposed on inner edge 414 and/or outer edge 416 would be understood by a PHOSITA.

As shown in FIG. 4, channels 408 may have a cruciform shape. Channels 408 may have one or more other shapes, as well, such as, for example, triangular, rectangular, circular, tear drop, or dovetail. Modification of channels 408 to include one or more other shapes would be understood by a PHOSITA.

As discussed above, first clamp 400 may include two first clamp sections 402 joined together to substantially encircle the associated diffuser. First clamp sections 402 may be disposed around an associated diffuser so that end portions 410 of one first clamp section 402 may near or in contact with end portions 410 of another first clamp section 402. First clamp sections 402 may be connected together at end portions 410 using a plurality of first clamp bolts 422 (shown in FIG. 7) and through holes 412. First clamp sections 402 also may be connected together at end portions 410 using lock nuts, ratchets, and the like, as would be understood by a PHOSITA.

Tightening of the first clamp bolts may provide a sufficient grip between first clamp 400 and the associated diffuser so as to prevent movement of first clamp 400 in the vertical direction (e.g., either toward or away from the associated inlet mixer) and/or about an axial direction of the associated diffuser. Positioning of the guide ears of the associated diffuser in offsets 406 also may help to prevent movement of first clamp 400 in the vertical direction (toward the associated inlet mixer) and/or may help to prevent rotation of first clamp 400 about an axial direction of the associated diffuser.

First clamp sections 402 may be connected together using other types of connections and/or connectors. First clamp sections 402 may be hinged together, for example, on one side. End portions 410 may include, for example, male and/or female dovetail joints. Modification of first clamp sections 402 so that they may be connected together using other types of connections and/or connectors would be understood by a PHOSITA.

Interaction of first clamp 400 with connectors and a second clamp with be discussed in detail below.

Figure 5:
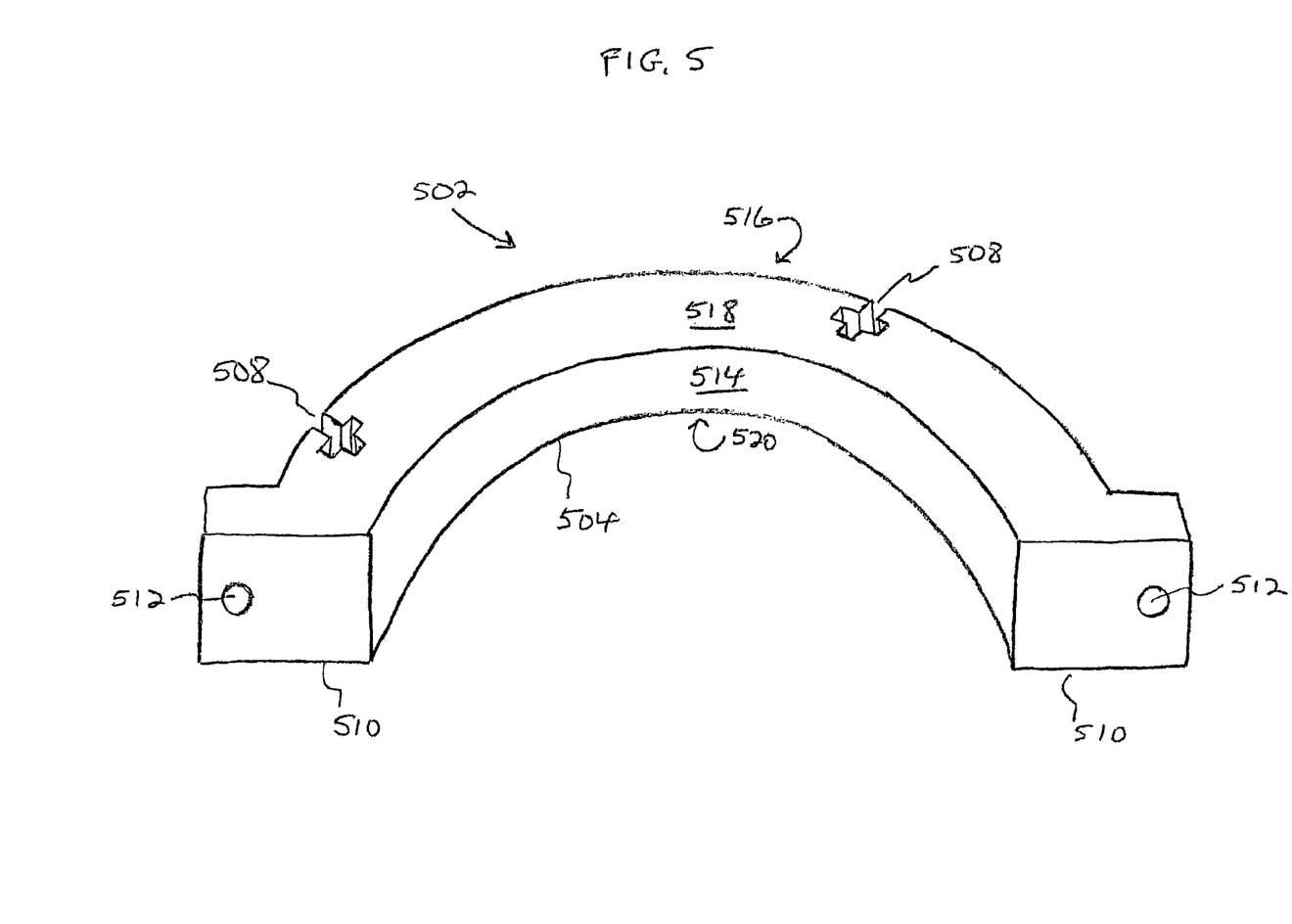
FIG. 5 is a detailed view of a second clamp section of a second clamp in accordance with example embodiments.

FIG. 5 is a detailed view of second clamp section 502 of second clamp 500 (shown in FIG. 7) in accordance with example embodiments. Second clamp section 502 may include body 504, channels 508, end portions 510, and/or through holes 512. Body 504 may include inner edge 514, outer edge 516, top surface 518, and/or bottom surface 520.

Second clamp 500 may be designed for installation on an associated inlet mixer. As a result, second clamp section 502 may be physically smaller and/or have a smaller radius of curvature than a clamp section designed for installation on an associated diffuser.

Second clamp 500 may include two second clamp sections 502 joined together to substantially encircle the associated inlet mixer. In the alternative, second clamp 500 may include a single-piece clamp. However, the use of a single-piece clamp may require installation prior to or together with installation of the associated inlet mixer and/or diffuser, or at least partial disassembly of an already installed inlet mixer and/or diffuser. In the alternative, second clamp 500 may include more than two clamp sections. Modification of second clamp 500 to include a single-piece clamp or more than two clamp sections would be understood by a PHOSITA.

Although not required, second clamp sections 502 of second clamp 500 may be substantially identical. Such an arrangement would facilitate manufacture, supply, installation, and replacement of second clamp 500.

A cross-section of body 504 may be square, rectangular, or some other shape. Modification of body 504 to a desired cross-sectional shape would be understood by a PHOSITA.

As shown in FIG. 5, second clamp section 502 may include channels 508. Channels 508 may extend completely through body 504 (i.e., from top surface 518 to bottom surface 520). In the alternative, channels 508 may extend only partly through body 504. Modification of body 504 so that channels 508 extend completely through or only partly through body 504 would be understood by a PHOSITA.

As shown in FIG. 5, second clamp section 502 may include two channels 508. In the alternative, second clamp section 502 may include only one channel 508 or more than two channels 508. Modification of second clamp section 502 to include only one channel 508 or more than two channels 508 would be understood by a PHOSITA.

As shown in FIG. 5, channels 508 may be disposed on outer edge 516 of body 504 (e.g., so that outer edge 516 includes a portion of channel 508). In the alternative, for example, channels 508 may be disposed within body 504 of second clamp section 502 (i.e., between inner edge 514 and outer edge 516) and/or on inner edge 514 of body 504 (e.g., so that inner edge 514 includes a portion of channel 508). Modification of second clamp section 502 so that channels 508 are disposed within body 504 and/or on inner edge 514 would be understood by a PHOSITA.

As shown in FIG. 5, channels 508 may have a cruciform shape. Channels 508 may have one or more other shapes, as well, such as, for example, triangular, rectangular, circular, tear drop, or dovetail. Modification of channels 508 to include one or more other shapes would be understood by a PHOSITA.

As discussed above, second clamp 500 may include two second clamp sections 502 joined together to substantially encircle the associated inlet mixer. Second clamp sections 502 may be disposed around an associated inlet mixer so that end portions 510 of one second clamp section 502 may near or in contact with end portions 510 of another second clamp section 502. Second clamp section 502 may be connected together at end portions 510 using a plurality of second clamp bolts 522 (shown in FIG. 7) and through holes 512. Second clamp sections 502 also may be connected together at end portions 510 using lock nuts, ratchets, and the like, as would be understood by a PHOSITA.

Tightening of the second clamp bolts may provide a sufficient grip between second clamp 500 and the associated inlet mixer so as to prevent movement of second clamp 500 in the vertical direction (i.e., either toward or away from the associated diffuser) and/or about an axial direction of the associated inlet mixer.

Second clamp sections 502 may be connected together using other types of connections and/or connectors. Second clamp section 502 may be hinged together, for example, on one side. End portions 510 may include, for example, male and/or female dovetail joints. Modification of second clamp sections 502 so that they may be connected together using other types of connections and/or connectors would be understood by a PHOSITA.

Figure 6A:
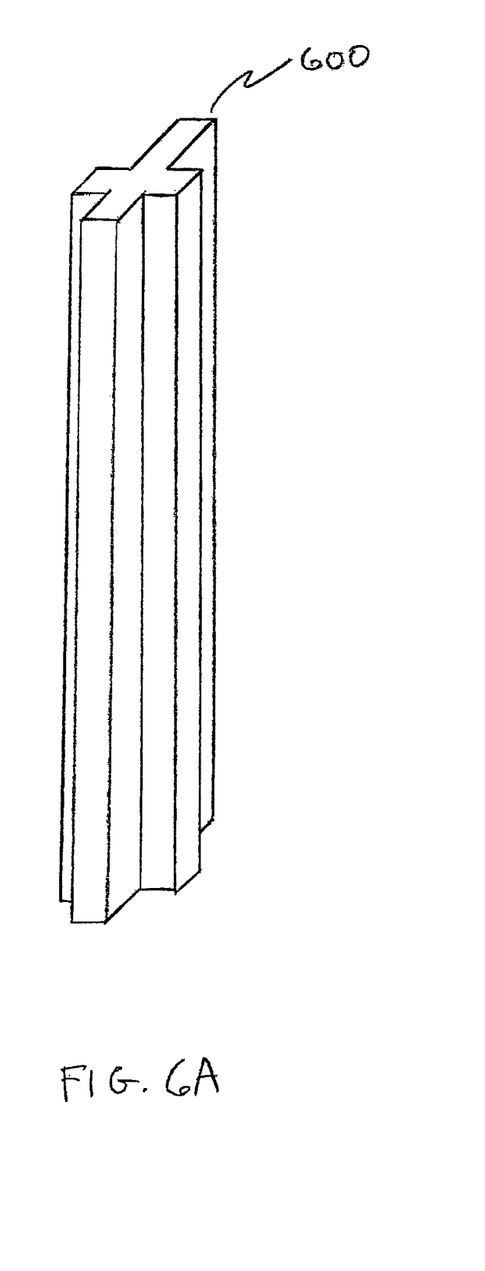
FIG. 6A is a perspective view of a connector in accordance with example embodiments.

FIG. 6A is a perspective view of connector 600 in accordance with example embodiments. Connectors 600 may be configured to connect first clamp 400 and second clamp 500. Connectors 600 may be configured to connect first clamp sections 402 and second clamp sections 502. Connectors 600 may have a cross-section similar to channels 408 and/or channels 508.

Figure 6B:
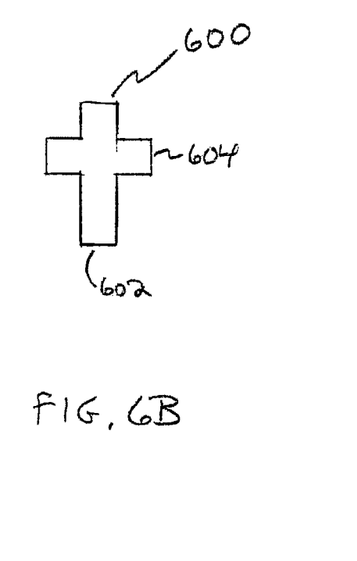
FIG. 6B is a cross-sectional view of the connector of FIG. 6A.

FIG. 6B is a cross-sectional view of connector 600 in accordance with example embodiments. Connectors 600 may have a cruciform shape including, for example, main body 602 and transepts 604.

Connectors 600 may have one or more other shapes, as well, such as, for example, triangular, rectangular, circular, tear drop, or dovetail. Modification of connectors 600 to include one or more other shapes would be understood by a PHOSITA. Modification of connectors 600 to have a cross-section similar to channels 408 and/or channels 508 also would be understood by a PHOSITA.

One or more connectors 600 may be fixed to first clamp section 402. For example, when first clamp section 402 includes two channels 408, one connector 600 may be fixed to first clamp section 402 in one channel 408 and/or another connector 600 may be fixed to first clamp section 402 in the other channel 408. Connectors 600 may be fixed to first clamp sections 402 by welding, for example, or one or more other methods so that connectors 600 do not move relative to first clamp sections 402. Methods for fixing connectors 600 to first clamp sections 402 would be understood by a PHOSITA.

One or more connectors 600 may be fixed to second clamp section 502. For example, when second clamp section 502 includes two channels 508, one connector 600 may be fixed to second clamp section 502 in one channel 508 and/or another connector 600 may be fixed to second clamp section 502 in the other channel 508. Connectors 600 may be fixed to second clamp sections 502 by welding, for example, or one or more other methods so that connectors 600 do not move relative to second clamp sections 502. Methods for fixing connectors 600 to second clamp sections 502 would be understood by a PHOSITA.

As would be understood by a PHOSITA, materials used in and fabrication processes for first clamp 400, second clamp 500, and/or connectors 600 may be selected so as to minimize galvanic corrosion, intergranular stress corrosion cracking ("IGSCC"), activation by neutron and gamma flux, and/or other problems associated with nuclear plants. Thus, the materials might include, for example, stainless steels (e.g., type 304 stainless steel, type 316 stainless steel), molybdenum alloys, and/or titanium alloys.

Figure 7:
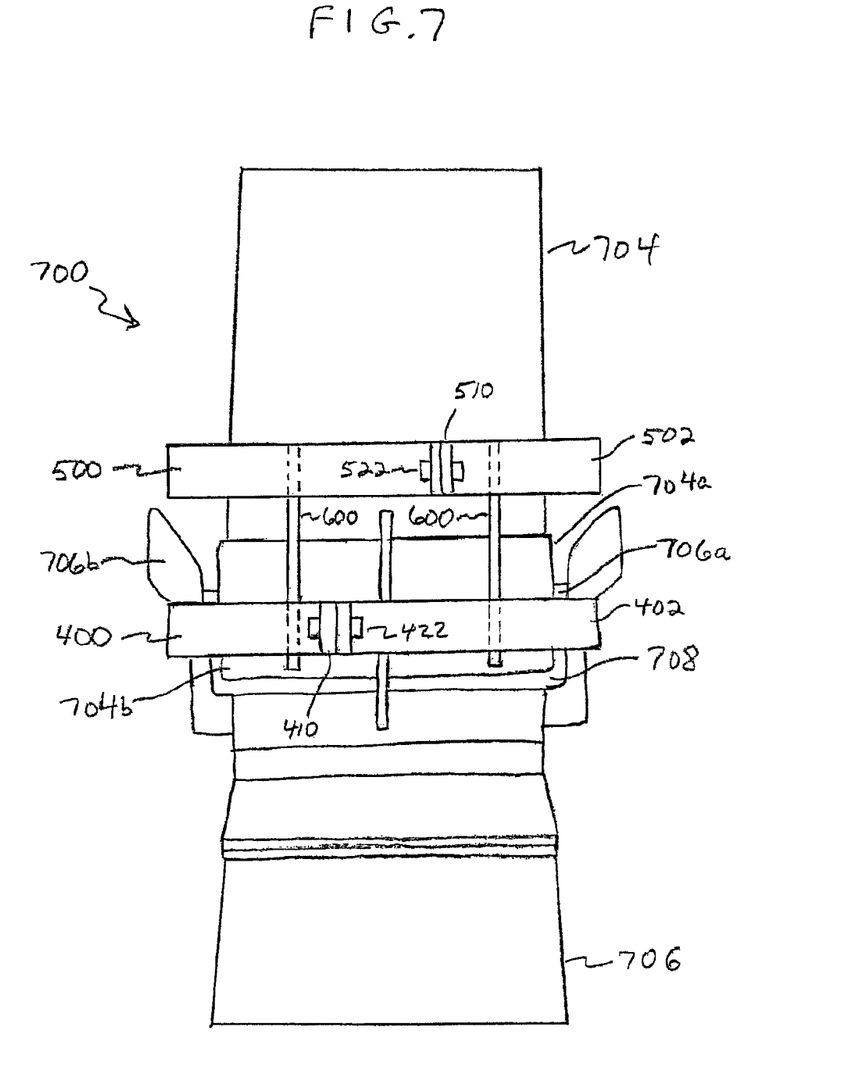
FIG. 7 is a cross-sectional view of a jet pump assembly according to example embodiments.

FIG. 7 is a cross-sectional view of jet pump assembly 700 according to example embodiments. Jet pump assembly 700 may include inlet mixer 704 and diffuser 706. The interface between inlet mixer 704 and diffuser 706 is slip joint 708. Bottom portion 704a of inlet mixer 704 may be inserted into upper crown 706a of diffuser 706 to integrate inlet mixer 704 with diffuser 706. Distal end 704b of inlet mixer 704 may rest in upper crown 706a of diffuser 706 to form slip joint 708.

In FIG. 7, first clamp 400 may include two first clamp sections 402 joined together to substantially encircle diffuser 706. First clamp sections 402 may be connected together at end portions 410 using a plurality of first clamp bolts 422. First clamp sections 402 may be disposed so that offsets 406 accommodate guide ears 706b of diffuser 706. Channels 408 may extend completely through first clamp sections 402.

In FIG. 7, second clamp 500 may include two second clamp sections 502 joined together to substantially encircle inlet mixer 704. Second clamp sections 502 may be connected together at end portions 510 using a plurality of second clamp bolts 522. Channels 508 may extend completely through second clamp sections 502.

In FIG. 7, connectors 600 may be fixed to first clamp 400 so that connectors 600 may not move relative to first clamp 400. Connectors 600 may not be fixed to second clamp 500 so that connectors 600 may move relative to second clamp 500.

In FIG. 7, connectors 600 may allow movement of first clamp 400 relative to second clamp 500 in a first direction between first clamp 400 and second clamp 500. The allowed movement of first clamp 400 relative to second clamp 500 may be linear movement. The first direction may be, for example, an axial direction of inlet mixer 704, an axial direction of diffuser 706, and/or an axial direction of jet pump assembly 700. The allowed movement may relate, for example, to thermal expansion of inlet mixer 704, diffuser 706, and/or other related components.

In example embodiments, connectors 600 may be fixed to second clamp 500 and may not be fixed to first clamp 400. In example embodiments, one or more connectors 600 may be fixed to first clamp 400 and may not be fixed to second clamp 500, while one or more other connectors 600 may be fixed to second clamp 500 and may not be fixed to first clamp 400. In these embodiments as well, connectors 600 may allow movement of first clamp 400 relative to second clamp 500 in the first direction between first clamp 400 and second clamp 500.

In FIG. 7, connectors 600 may limit and/or prevent movement of first clamp 400 relative to second clamp 500 in a second direction perpendicular to the first direction. The limited and/or prevented movement of first clamp 400 relative to second clamp 500 may be linear movement. The limited and/or prevented movement of first clamp 400 relative to second clamp 500 may be rotational movement about an axis defined in the first direction. The axis may be, for example, an axis of inlet mixer 704, an axis of diffuser 706, and/or an axis of jet pump assembly 700. The limited and/or prevented movement may relate, for example, to oscillating motion, FIV, and/or turbulent flow internal to jet pump assembly 700.

In FIG. 7, first clamp 400, second clamp 500, and/or connectors 600 may allow movement of inlet mixer 704 relative to diffuser 706 in an axial direction of inlet mixer 704, an axial direction of diffuser 706, and/or an axial direction of jet pump assembly 700. The allowed movement of inlet mixer 704 relative to diffuser 706 may be, for example, linear movement. The allowed movement may relate, for example, to thermal expansion of inlet mixer 704, diffuser 706, and/or other related components.

In FIG. 7, first clamp 400, second clamp 500, and/or connectors 600 may limit and/or prevent movement of inlet mixer 704 relative to diffuser 706 in a direction perpendicular to an axial direction of inlet mixer 704, an axial direction of diffuser 706, and/or an axial direction of jet pump assembly 700. The limited and/or prevented movement of inlet mixer 704 relative to diffuser 706 may be linear movement. The limited and/or prevented movement of inlet mixer 704 relative to diffuser 706 may be rotational movement about an axial direction of inlet mixer 704, an axial direction of diffuser 706, and/or an axial direction of jet pump assembly 700. The limited and/or prevented movement may relate, for example, to oscillating motion, FIV, and/or turbulent flow internal to jet pump assembly 700.

The arrangement in FIG. 7 may maintain stiffness of slip joint 708 to prevent oscillating motion and/or suppress FIV, while simultaneously allowing thermal expansion of inlet mixer 704, diffuser 706, and/or other related components.

Figure 8:
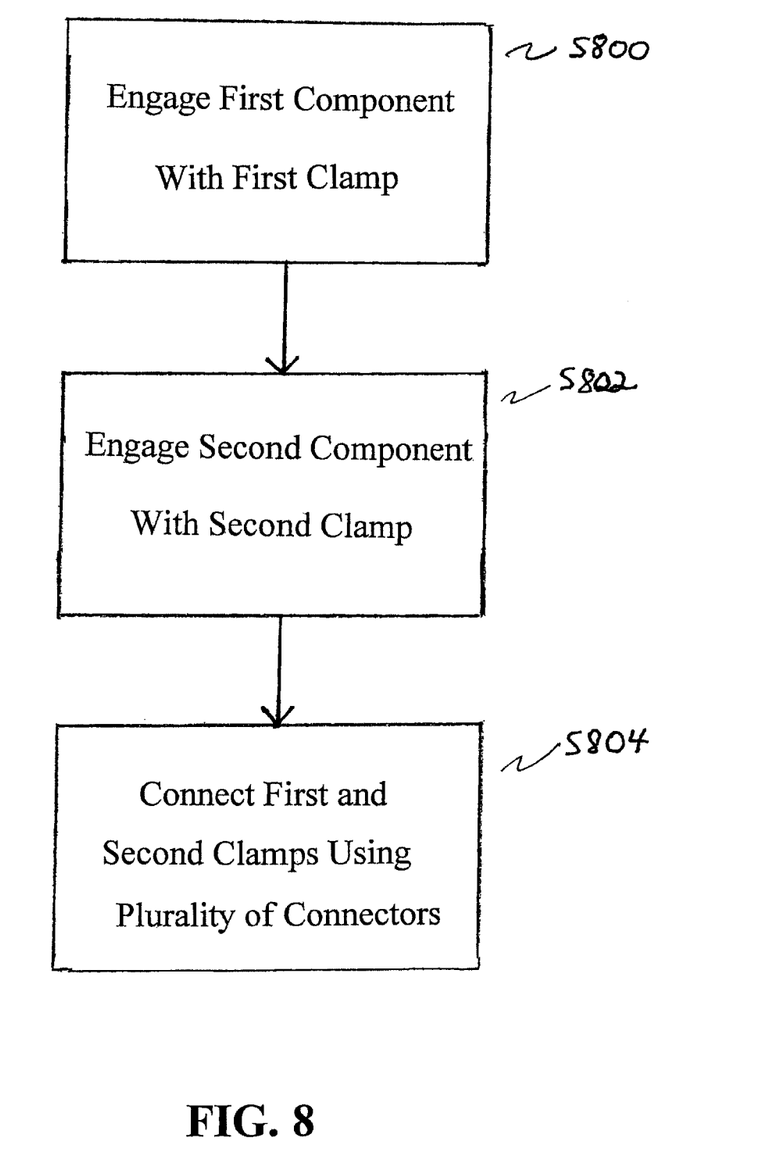
FIG. 8 is a flowchart of a method for controlling movement of a first component integrated with a second component according to example embodiments.

FIG. 8 is a flowchart of a method for controlling movement of a first component integrated with a second component according to example embodiments. As shown in S800 of FIG. 8, a first clamp may engage the first component. As related to FIGS. 7 and 8, first clamp 400 may engage diffuser 706.

As shown in S802 of FIG. 8, a second clamp may engage the second component. As related to FIGS. 7 and 8, second clamp 500 may engage inlet mixer 704.

As shown in S804 of FIG. 8, the first and second clamps may be connected using a plurality of connectors. As related to FIGS. 7 and 8, connectors 600 may connect first clamp 400 and second clamp 500.

In FIG. 8, engaging the first component with a first clamp (S800), engaging the second component with a second clamp (S802), and connecting the first and second clamps using a plurality of connectors (S804) may be performed in any order. As related to FIGS. 7 and 8, for example, first clamp 400 and second clamp 500 may be connected using connectors 600. Then first clamp 400 may engage diffuser 706, followed by second clamp 500 engaging inlet mixer 704. In the alternative, second clamp 500 may engage inlet mixer 704, followed by first clamp 400 engaging diffuser 706. Or first clamp 400 may engage diffuser 706 at the same time that second clamp 500 engages inlet mixer 704. In another example, first clamp 400 may engage diffuser 706 at the same time that second clamp 500 engages inlet mixer 704. Then first clamp 400 and second clamp 500 may be connected using connectors 600.

As related to FIGS. 7 and 8, one or more connectors 600 may be fixed to first clamp 400 prior to first clamp 400 engaging diffuser 706. Similarly, one or more connectors 600 may be fixed to second clamp 500 prior to second clamp 500 engaging inlet mixer 704. For example, all connectors 600 may be fixed to first clamp 400 prior to first clamp 400 engaging diffuser 706, all connectors 600 may be fixed to first clamp 400 prior to second clamp 500 engaging inlet mixer 704, and/or all connectors 600 may be fixed to first clamp 400 prior to connectors 600 connecting first clamp 400 and second clamp 500. In another example, one or more connectors 600 may be fixed to second clamp 500 prior to second clamp 500 engaging inlet mixer 704, one or more connectors 600 may be fixed to second clamp 500 prior to first clamp 400 engaging diffuser 706, and/or one or more connectors 600 may be fixed to second clamp 500 prior to connectors 600 connecting first clamp 400 and second clamp 500.

As related to FIGS. 7 and 8, once first clamp 400 engages diffuser 706, second clamp 500 engages inlet mixer 704, and first clamp 400 and second clamp 500 are connected using connectors 600, connectors 600 may allow movement of first clamp 400 relative to second clamp 500 in a first direction between first clamp 400 and second clamp 500 and/or may allow movement of inlet mixer 704 relative to diffuser 706 in the first direction. That movement may be, for example, linear movement of inlet mixer 704 relative to diffuser 706. The first direction may be, for example, an axial direction of jet pump assembly 700, inlet mixer 704, and/or diffuser 706. The first direction may be, for example, vertical.

As related to FIGS. 7 and 8, once first clamp 400 engages diffuser 706, second clamp 500 engages inlet mixer 704, and first clamp 400 and second clamp 500 are connected using connectors 600, connectors 600 may limit and/or prevent movement of first clamp 400 relative to second clamp 500 in a second direction perpendicular to the first direction and/or may limit and/or prevent movement of inlet mixer 704 relative to diffuser 706 in the second direction. That movement may be, for example, linear movement of inlet mixer 704 relative to diffuser 706. That movement may be, for example, rotational movement of inlet mixer 704 relative to diffuser 706 about an axis defined in the first direction. The second direction may be, for example, horizontal (e.g., defining a horizontal plane).

While example embodiments have been particularly shown and described, it will be understood by those of ordinary skill in the art that various changes in form and details may be made therein without departing from the spirit and scope of the present invention as defined by the following claims.

What is claimed is:

1. An apparatus for controlling movement of a first component integrated with a second component, the apparatus comprising:
   a first clamp configured to directly engage an outer surface of the first component;
   a second clamp configured to directly engage an outer surface of the second component; and
   a plurality of connectors configured to connect the first and second clamps;
   wherein when the first clamp directly engages the outer surface of the first component, the second clamp directly engages the outer surface of the second component, and the plurality of connectors connects the first and second clamps, the connectors are further configured to allow movement of the first clamp relative to the second clamp in a first direction between the first and second clamps by sliding in the first direction relative to the first clamp, the second clamp, or the first and second clamps, and
   wherein when the first clamp directly engages the outer surface of the first component, the second clamp directly engages the outer surface of the second component, and the plurality of connectors connects the first and second clamps, the connectors are further configured to limit movement of the first clamp relative to the second clamp in a second direction perpendicular to the first direction.

2. The apparatus of claim 1, wherein the connectors are further configured to allow linear movement of the first clamp relative to the second clamp in the first direction.

3. The apparatus of claim 1, wherein the connectors are further configured to limit linear movement of the first clamp relative to the second clamp in the second direction.

4. The apparatus of claim 1, wherein the connectors are further configured to limit rotational movement of the first clamp relative to the second clamp about an axis defined in the first direction.

5. The apparatus of claim 1, wherein the connectors are further configured to prevent linear movement of the first clamp relative to the second clamp in the second direction.

6. The apparatus of claim 1, wherein the connectors are further configured to prevent rotational movement of the first clamp relative to the second clamp about an axis defined in the first direction.

7. The apparatus of claim 1, wherein the first clamp includes two or more first clamp sections.

8. The apparatus of claim 7, wherein the two or more first clamp sections are connected together using a plurality of first clamp bolts.

9. The apparatus of claim 1, wherein the first clamp includes two or more first clamp sections, and
wherein the second clamp includes two or more second clamp sections.

10. The apparatus of claim 9, wherein the two or more first clamp sections are connected together using a plurality of first clamp bolts, and
wherein the two or more second clamp sections are connected together using a plurality of second clamp bolts.

11. An apparatus for controlling movement of components in a nuclear power plant, the nuclear power plant including a reactor pressure vessel and a jet pump assembly within the reactor pressure vessel, the apparatus comprising:
a first clamp configured to engage an outer surface of an inlet mixer of the jet pump assembly;
a second clamp configured to engage an outer surface of a diffuser of the jet pump assembly; and
a plurality of connectors configured to connect the first and second clamps;
wherein when the first clamp engages the outer surface of the inlet mixer, the second clamp engages the outer surface of the diffuser, and the plurality of connectors connects the first and second clamps, the connectors are further configured to allow movement, due to thermal expansion, of the first clamp relative to the second clamp in an axial direction of the jet pump assembly by sliding in the axial direction relative to the first clamp, the second clamp, or the first and second clamps, and
wherein when the first clamp engages the outer surface of the inlet mixer, the second clamp engages the outer surface of the diffuser, and the plurality of connectors connects the first and second clamps, the connectors are further configured to limit movement of the first clamp relative to the second clamp in a direction perpendicular to the axial direction of the jet pump assembly.

12. The apparatus of claim 11, wherein the connectors are further configured to allow linear movement of the first clamp relative to the second clamp in the axial direction of the jet pump assembly.

13. The apparatus of claim 11, wherein the connectors are further configured to limit linear movement of the first clamp relative to the second clamp in the direction perpendicular to the axial direction of the jet pump assembly.

14. The apparatus of claim 11, wherein the connectors are further configured to limit rotational movement of the first clamp relative to the second clamp about the axial direction of the jet pump assembly.

15. An apparatus for controlling movement of components in a nuclear power plant, the nuclear power plant including a reactor pressure vessel and a jet pump assembly within the reactor pressure vessel, the apparatus comprising:
a first clamp configured to directly engage an outer surface of an inlet mixer of the jet pump assembly;
a second clamp configured to directly engage an outer surface of a diffuser of the jet pump assembly; and
a plurality of connectors configured to connect the first and second clamps;
wherein when the first clamp directly engages the outer surface of the inlet mixer, the second clamp directly engages the outer surface of the diffuser, and the plurality of connectors connects the first and second clamps, the first clamp, second clamp, and connectors are further configured to allow movement, due to thermal expansion, of the inlet mixer relative to the diffuser in an axial direction of the jet pump assembly by sliding in the axial direction relative to the first clamp, the second clamp, or the first and second clamps, and
wherein when the first clamp directly engages the outer surface of the inlet mixer, the second clamp directly engages the outer surface of the diffuser, and the plurality of connectors connects the first and second clamps, the first clamp, second clamp, and connectors are further configured to limit movement of the inlet mixer relative to the diffuser in a direction perpendicular to the axial direction of the jet pump assembly.

16. The apparatus of claim 15, wherein the first clamp, second clamp, and connectors are further configured to allow linear movement of the inlet mixer relative to the diffuser in the axial direction of the jet pump assembly.

17. The apparatus of claim 15, wherein the first clamp, second clamp, and connectors are further configured to limit linear movement of the inlet mixer relative to the diffuser in the direction perpendicular to the axial direction of the jet pump assembly.

18. The apparatus of claim 15, wherein the first clamp, second clamp, and connectors are further configured to limit rotational movement of the inlet mixer relative to the diffuser about the axial direction of the jet pump assembly.

19. A method for controlling movement of a first component integrated with a second component, the method comprising:
engaging an outer surface of the first component with a first clamp;
engaging an outer surface of the second component with a second clamp; and
connecting the first and second clamps using a plurality of connectors;
wherein when the first clamp engages the outer surface of the first component, the second clamp engages the outer surface of the second component, and the plurality of connectors connects the first and second clamps, the connectors are configured to allow movement of the first clamp relative to the second clamp in a first direction between the first and second clamps by sliding in the first direction relative to the first clamp, the second clamp, or the first and second clamps, and
wherein when the first clamp engages the outer surface of the first component, the second clamp engages the outer surface of the second component, and the plurality of connectors connects the first and second clamps, the connectors are further configured to limit movement of the first clamp relative to the second clamp in a second direction perpendicular to the first direction.

20. The apparatus of claim 11, wherein the first clamp is further configured to directly engage the outer surface of the inlet mixer of the jet pump assembly.

21. The apparatus of claim 11, wherein the second clamp is further configured to directly engage the outer surface of the diffuser of the jet pump assembly.

* * * * *